United States Patent [19]

Fisher

[11] Patent Number: 4,825,019
[45] Date of Patent: Apr. 25, 1989

[54] CURSOR CONTROL ACCESSORY FOR A COMPUTER KEYBOARD

[76] Inventor: David H. Fisher, 1950 Foxborrough Ct., Hayden Lake, Id. 83835

[21] Appl. No.: 181,483

[22] Filed: Apr. 14, 1988

[51] Int. Cl.[4] .................. H01H 13/70; H01H 25/00
[52] U.S. Cl. ........................ 200/6 A; 273/DIG. 28; 235/145 R; 340/709
[58] Field of Search .................. 200/6 A; 340/709; 273/DIG. 28, 148 B; 235/145 R, 146

[56] References Cited

U.S. PATENT DOCUMENTS

| | | | |
|---|---|---|---|
| 3,950,634 | 4/1976 | Speiser | 235/145 R |
| 4,029,915 | 6/1977 | Ojima | 200/5 A |
| 4,256,931 | 3/1981 | Palisek | 200/6 A X |
| 4,386,776 | 6/1983 | Bromley | 200/6 A X |
| 4,493,219 | 1/1985 | Sharp et al. | 200/6 A X |
| 4,520,240 | 5/1985 | Swindler | 200/5 R |
| 4,575,591 | 3/1986 | Lugaresi | 200/6 A |

FOREIGN PATENT DOCUMENTS 2144582A 3/1985 United Kingdom ............ 200/6 A

OTHER PUBLICATIONS

IBM Technical Disclosure Bulletin, vol. 28, No. 5, Oct. 1985, p. 1859.

Primary Examiner—Roy N. Envall, Jr.
Attorney, Agent, or Firm—Wells, St. John & Roberts

[57] ABSTRACT

A cursor control accessory is shown as an integral base overlying an array of keys including independently movable cursor control keys. It is provided with a protruding handle for use as a joystick. Outwardly protruding walls are adapted to be freely located between keys in the array and engage the upper surface of the keyboard housing. Recessed key engaging surfaces are provided above each cursor control key and are adapted to depress the selected cursor control key or keys in response to rocking movement of the base relative to the keyboarding housing. Base areas located above non-functional keys are recessed inwardly or relieved to prevent key operation during cursor usage.

27 Claims, 3 Drawing Sheets

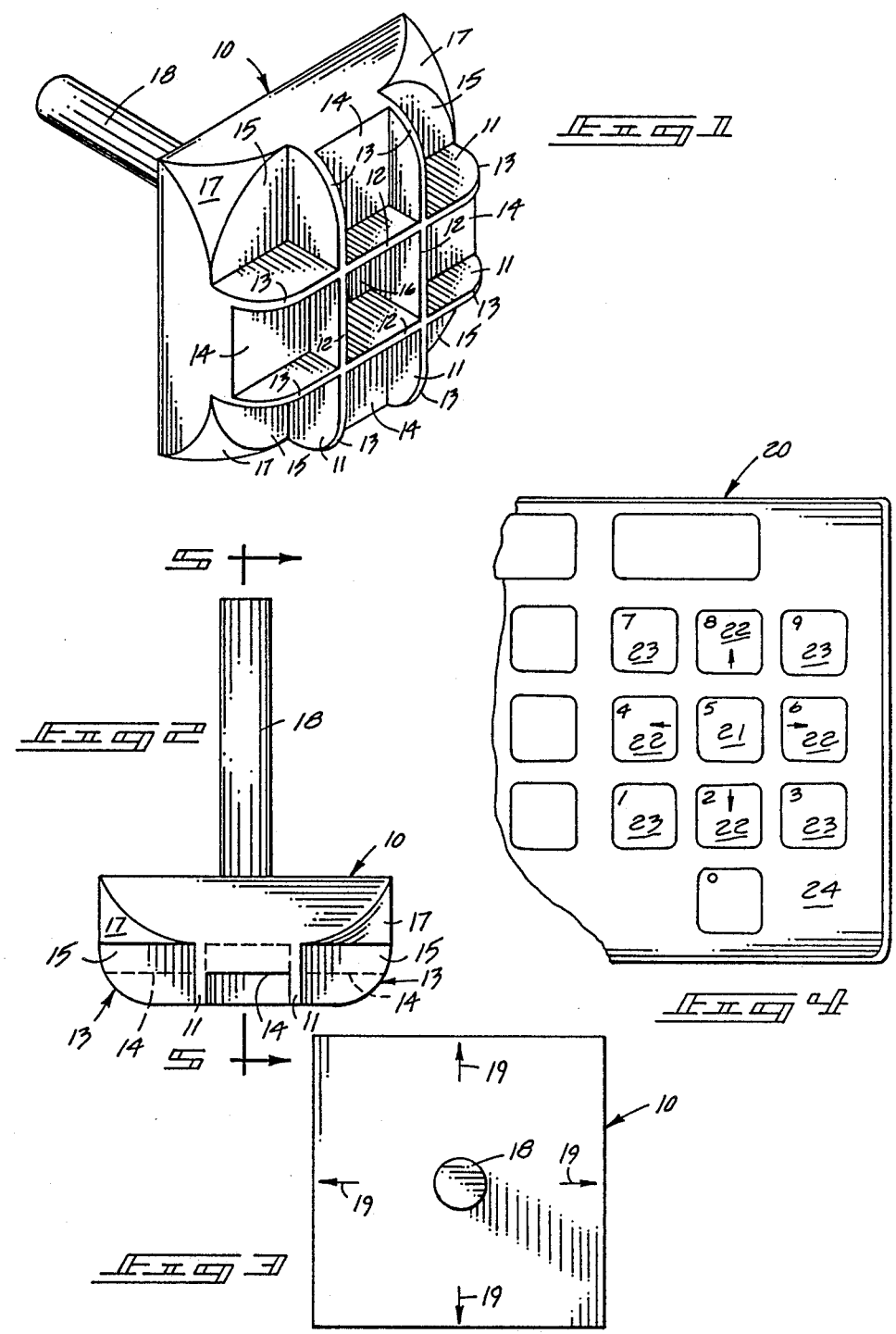

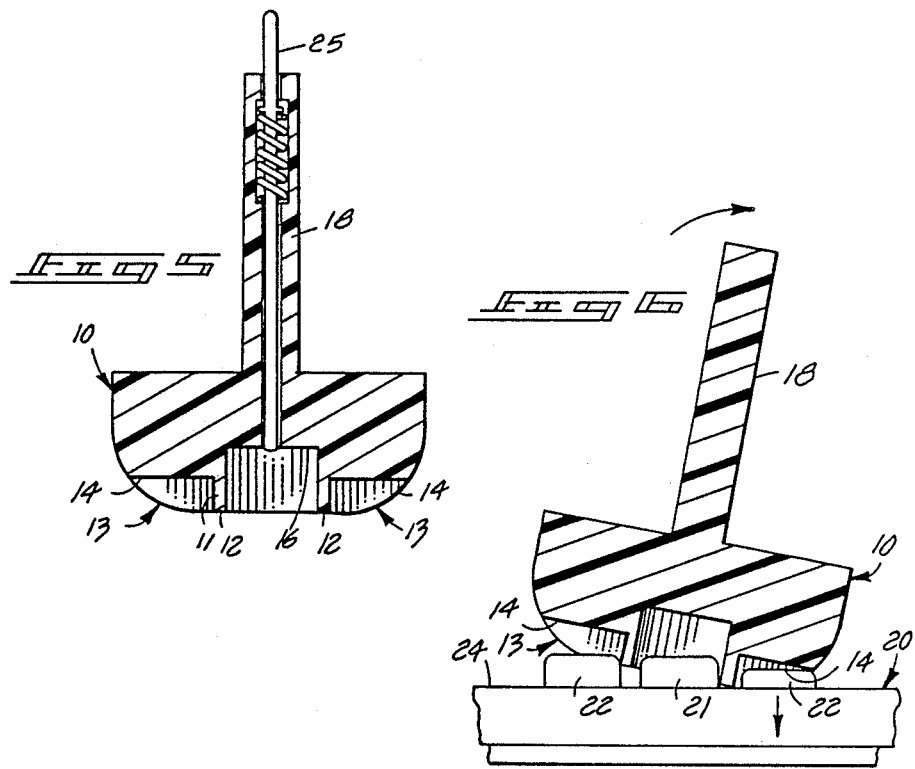
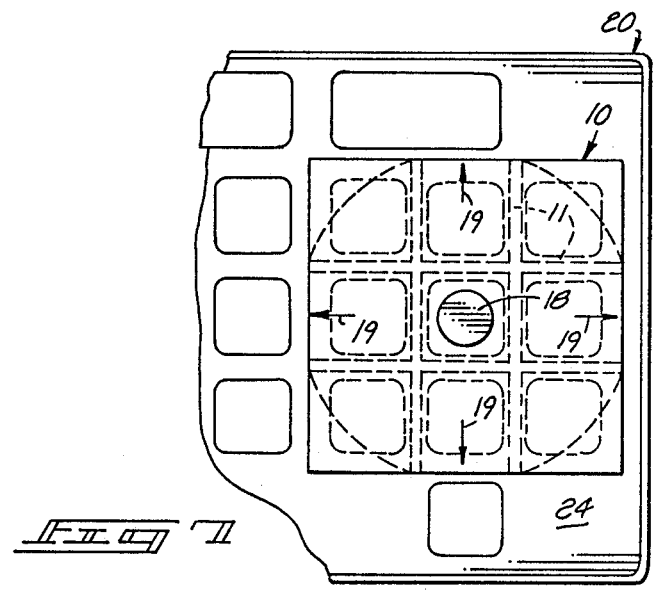

U.S. Patent  Apr. 25, 1989  Sheet 3 of 3  4,825,019
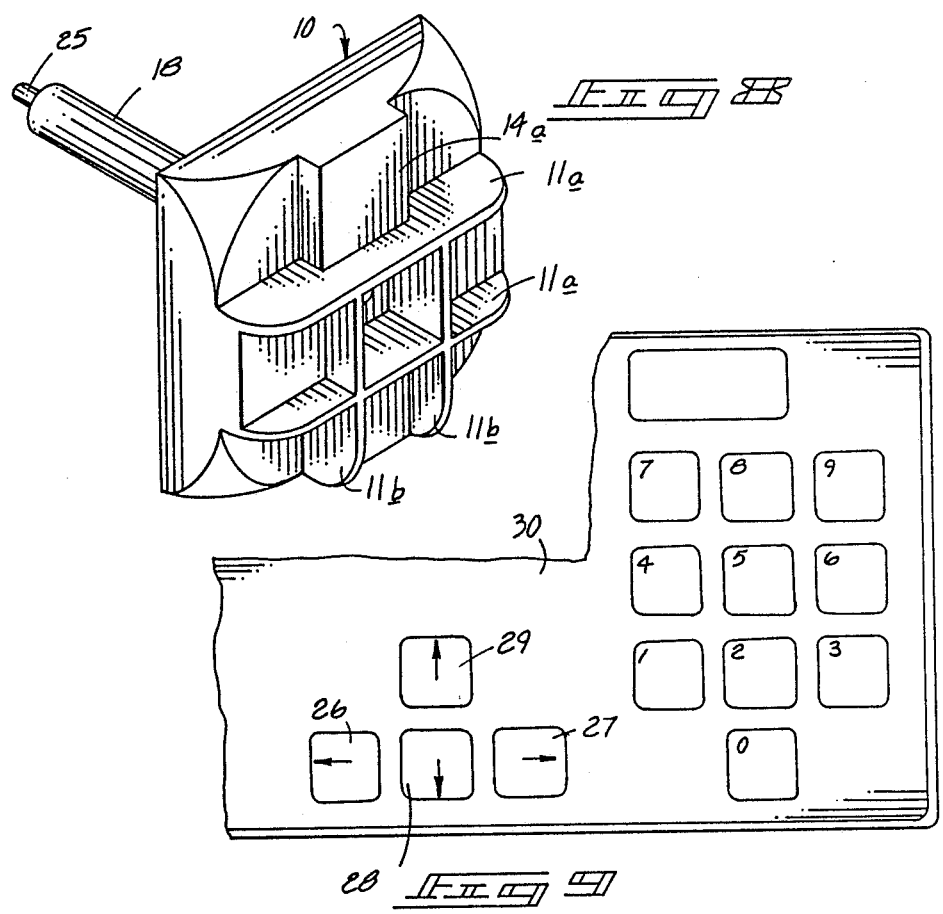
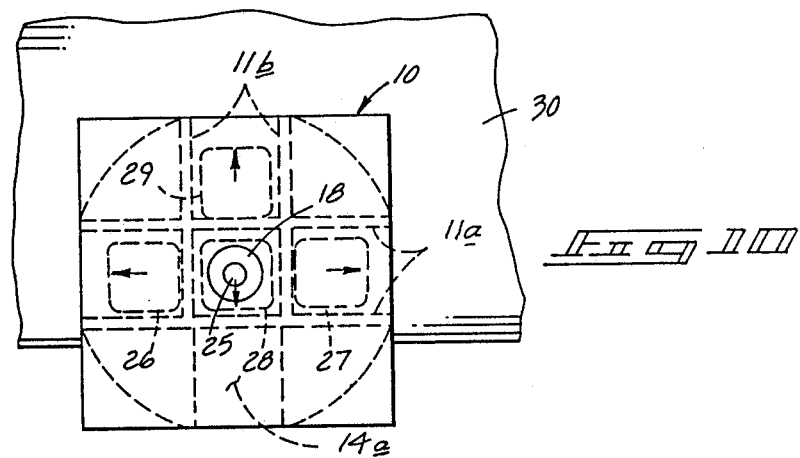

CURSOR CONTROL ACCESSORY FOR A COMPUTER KEYBOARD

TECHNICAL FIELD

A cursor control accessory is provided in the form of a rockable pad or joystick designed to overlie a conventional array of cursor control keys in a computer keyboard. To accessory facilitates cursor control functions by integrating the manual manipulation of multiple cursor control keys.

BACKGROUND OF THE INVENTION

Computer keyboards are typically provided with multiple function keys arranged in which is termed a "10 key pad." The keys included in a 10 key pad are used for numerical input purposes. Four of these keys, arranged perpendicularly across the 10 key pad in a rectangular array, are typically also used for cursor control to move the cursor up, down, or to each side about the screen associated with the computer. The manipulation of the four spaced keys interrupts the usual hand placement and keyboard input functions involved in the control of the computer.

Alternative dedicated cursor control keys are often provided on keyboards between the usual alphanumeric keys and the 10 key pad. They typically take the form of an arrow, in which three cursor control keys are arranged in a horizontal row, with a fourth key located directly above the center key of the three. Other cursor control key arrays are in the form of a cross, with a central key and directional keys to each side as well as above and below the central key.

While not limited to such purposes, the cursor control keys within a computer keyboard are very heavily used while playing games on a computer. Because the skill required for playing such games is heavily dependent upon quick response, many people find it difficult to properly control cursor movement by means of four independent keys. For this reason, it has become common to utilize cursor control accessories, such as a mouse or a joystick switch assembly, which must be wired to the computer.

The present invention arose from an effort to integrate the manual operations involved in using conventional cursor control keys, particularly in playing computer games. It provides a removable and non-attached keyboard accessory that can be readily placed over an array of cursor control keys in a keyboard. The user of a computer keyboard can then operate selected keys with one hand-controlled element.

The accessory can be in the form of an overlying pad and, in a preferred embodiment, includes an upstanding center handle that serves as a joystick. The accessory is positioned about the keyboard by the protruding keyboard keys. Its operation does not require the user to shift his or her view from the screen to the keyboard to assure that the proper cursor control keys are being depressed.

The accessory provides a very inexpensive and maintenance-free alternative to a joystick switch accessory or mouse.

BRIEF DESCRIPTION OF THE DRAWINGS

The preferred embodiments of the invention is illustrated in the accompanying drawings, in which:

FIG. 1 is a perspective view of a first embodiment of the accessory;

FIG. 2 is a side elevation view;

FIG. 3 is a top view;

FIG. 4 is a top fragmentary view showing a conventional 10 key pad;

FIG. 5 is a sectional view taken along 5—5 in FIG. 2, showing a modification of the accessory;

FIG. 6 is a sectional view showing rocking movement of the accessory on a keyboard;

FIG. 7 is a top view of the accessory located on a keyboard, the underlying keys being shown in phantom lines;

FIG. 8 is a perspective view of a second embodiment of the accessory;

FIG. 9 is a top fragmentary view showing a conventional arrow pad; and

FIG. 10 is a top view of the second embodiment located on a keyboard having an arrow pad.

DETAILED DESCRIPTION OF THE PREFERRED EMBODIMENTS

The following disclosure of the invention is submitted in compliance with the constitutional purpose of the Patent Laws "to promote the progress of science and useful arts" (Article 1, Section 8).

The cursor control attachment shown in the drawings is a unitary element, which can be molded from plastic materials. It can be molded in one piece, or in separable sections or elements that are subsequently joined to one another to produce the structure as described. The accessory can be made from any material, molded plastic being most desirable because of the ability to produce the accessory in one piece, the decorative surface capabilities that are available in plastics to match computer products, and the usual economies of production available in molded plastic technologies.

A first embodiment of the cursor control accessory is adapted to be utilized in conjunction with a conventional computer keyboard 20 (FIGS. 4 and 7) provided with a conventional 10 key pad, which typically is located at one side of the larger alphanumeric keyboard used for inputting information to a computer and accessory screen (not shown). To provide manual control of the screen cursor, it is conventional to use four of the ten keys as dual function keys in which one of their functions is to control cursor movement. In the normal 10 key pad arrangement shown in FIG. 4, the numerical keys for inputting the numbers 2, 4, 6 and 8 are used for cursor movement to sequence the cursor about the screen in directions that are down, left, right and up, respectively. These directions are denoted by the small arrows that appear on the respective cursor control keys in FIG. 4.

The cursor control keys 22 are arranged about a central key 21 that is used for inputting the number 5. They are also located within a rectangular array of movable keys on the keyboard 10 that includes diagonal or corner keys 23 that are used for inputting the numbers 1, 3, 7 and 9.

The nine keys in the rectangular array that includes the cursor keys 22, central key 21 and diagonal keys 24 movably project upwardly from the outer surface of the supporting keyboard housing 24. Keys 21, 22 and 23 are activated by depressing them downwardly or inwardly in the direction of keyboard housing 24. In normal usage, the cursor keys 22 are independently operated by the fingers of a user, either by moving one finger about the 10 key pad, or by using different fingers for the selected keys while maintaining the hand in a relatively stationary position. In either situation, independent manipulation of keys 22 requires substantial skill, practice and manual dexterity.

The cursor control accessory essentially comprises a unitary base 10 having two oppositely facing sides. When oriented in position for its intended use on a keyboard, one of the sides (shown in FIG. 1) faces downwardly. The remaining side normally faces upwardly and is shown in FIG. 3. Base 10 has a plurality of perpendicular walls 11 protruding to its one side. It also includes a plurality of key engaging surfaces 14 arranged about the one side of the base shown in FIG. 1. the number of spatial location of the key engaging surfaces 14 at the one side of base 10 correspond to the number and spatial location of selected cursor control keys 22 to be activated by rocking movement of the base 10.

Walls 11 bound the respective key engaging surfaces 14, which are located in inwardly recessed positions between pairs of the outwardly protruding wall 11. Each wall terminates along outer edges that include inwardly arcuate edge configurations 13 extending alongside the respective key engaging surfaces 14.

The illustrated cursor control accessory in FIGS. 1-7 is adapted to overlie the rectangular array of keys that includes the cursor keys 22, as shown in FIG. 7. By then rocking the base 10 relative to the keyboard housing 22 engaged by the outer edges of the protruding walls 11, the user can selectively actuate a desired cursor key 22, depending upon the direction of sideward tilting movement imparted to base 10. The edges of walls 11 engage the keyboard housing 22 between the protruding keys in the rectangular array that includes the cursor keys 22. Walls 11 act as guides to maintain base 10 in position relative to the various keys in the array. Directional arrays 19 can be provided at the upper or remaining side of the base 10 to serve as visual indications of the cursor movements that will be controlled by rocking base 10 relative to the keyboard 20. In the preferred embodiment shown, a rigid handle 18 protrudes outwardly from the remaining side of base 10 so that it can be grasped and rocked in the manner of a joystick switch common in the computer industry. When desired, a spring-biased plunger 25 can be extended through the center of handle 18 to provide selective actuation of the central key 21 (FIG. 5). This permits key 21 to be programmed for manual actuation required in playing a game in conjunction with cursor movement.

In the cursor control accessory shown in the drawings, each wall 11 is extended across the one side of base 10 in a perpendicular cruciform pattern that includes a rectangular recess at the center of the base adapted to be fitted about the central key 21 in the array of keys that includes the cursor keys 22. Walls 11 are arranged in the two intersecting spaced pairs extending perpendicular to one another across the one side of base 10. Each pair of walls 11 has an identical outer edge configuration that includes the coplanar central section 12 spanning a rectangular recess defined by the intersecting walls 11 and the inwardly arcuate adjacent terminal sections 13 that span the respective key engaging surfaces 14.

The edges 12 on walls 11 about the central recess are coplanar and lie in a plane parallel to and spaced outwardly from the plane of the key engaging surfaces 14. The coplanar edges 12 are designed to normally engage the outer surface of keyboard housing 24 about the four sides of the central key 21 to maintain base 10 in a position overlying and parallel to the keyboard housing 24. The inwardly arcuate edge configurations 13 are adapted to progressively engage the keyboard housing 24 in response to sideward rocking movement of the base, thereby bringing the selected key engaging surfaces 14 into contact with the top surface of the cursor key or keys 22 to be activated.

The inwardly extending recess formed at the center of the base member is illustrated as terminating at an inner surface 16. The plane of surface 16 is inwardly spaced with respect to the plane of the key engaging surfaces 14 so that the central key 21 of the keyboard 20 is not engaged by rocking motion of the surface 16. Similarly, the diagonal corners of base 10 between the perpendicular pairs of walls 11 are inwardly relieved to preclude contact with the keys 23 which lie adjacent to the cursor control keys 22 and in the diagonal corners of the array of keys. This relief is provided by recessing the corner surfaces 15 inwardly relative to the plane of the key engaging surfaces 14 and by rounding the corner surfaces 17 facing to the one side of base 10.

The operation of the cursor control accessory is believed to be evident from the above description and from the illustrations specifically shown in FIG. 6. The base 10 can be moved by the palm of one hand, or, when provided with the protruding handle 18, can be moved by grasping handle 18 and using it as a joystick. Software control of cursor movement might also provide for diagonal cursor movement which can be achieved by rocking the cursor control accessory toward a selected corner of the rectangular array of keys, thereby simultaneously actuating two of the cursor keys 22 without contacting the diagonal key 23 adjacent to them.

The base 10 always remains in contact with the keyboard housing 24 and the walls 11 always remain guided between adjacent keys in the array to keep it in a constant positional relationship overlying the keys being manipulated. The cursor control accessory provides a simple and effective one hand operation of the four or more independent cursor control keys, without requiring any temporary or permanent attachment to the keyboard itself. If additional cursor control keys are provided in the array, additional key engaging surfaces 14 can be located above them to engage and depress them also in response to rocking movement of base 10 relative to the keyboard housing 24.

The first embodiment of the accessory can also be used in controlling cursor keys arranged in the form of a cross. No change is required and the operational functions are identical to those described with respect to the rectangular key array.

To operate an arrow pad configuration (FIG. 9), a central plunger 25 is required. In such a key arrangement, the side keys 26, 27 flank a central "down" cursor control key 28 having an "up" cursor control key 29 directly above it. Where the keyboard 30 has no protruding ribs or other features adjacent these keys, the described embodiment requires no modification other than provision of a plunger as shown in FIG. 5.

To better accommodate an arrow pad layout along the bottom edge of a keyboard 30, the lower third of the base 10 might be totally eliminated, or the lower third of two walls 11 can be eliminated or broken off from the first embodiment. This is shown in FIG. 8, where walls 11a terminate at their intersections with walls 11b, and one key engaging surface 14a is not bounded on two sides by the parallel walls that project outwardly to the one side of base 10. The relative position of the second embodiment and an arrow pad is shown in FIG. 10. Rocking movement of base 10 to each side will actuate keys 26 or 27, respectively. Upward rocking movement will actuate key 29. The manual plunger 25 can be used to actuate key 28. It will be noted that the key engaging surfaces 14 still correspond in number and spatial location to the cursor control keys to be activated by rocking movement of the base, although the fourth surface 14 is now inoperative.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A cursor control accessory for a computer keyboard having a plurality of cursor control keys arranged about a keyboard housing in an array of projecting movable keys arranged about a central key, the attachment comprising:
    a base adapted to overlay the array of keys;
    an inwardly extending recess presented at one side of the base member adapted to freely receive a central key in the array;
    and a plurality of key engaging surfaces at the one side of the base member, the key engaging surfaces being adapted to respectively overlie selected individual cursor control keys in the array for engaging and depressing selected cursor control keys in response to rocking movement of the base relative to the keyboard housing.

2. The cursor control accessory of claim 1 wherein the key engaging surfaces at the one side of the base correspond in number and spatial location to the number and spatial location of selected cursor control keys to be activated by rocking movement of the base.

3. The cursor control accessory of claim 1 wherein selected key engaging surfaces are bounded on two sides by parallel walls having inwardly arcuate outer edges adapted to progressively engage the keyboard housing in response to rocking movement of the base.

4. The cursor control accessory of claim 1 wherein the inwardly extending recess is surrounded by outwardly facing surfaces adapted to engage the keyboard housing while the base is at rest in a normal overlying position that is parallel to the keyboard housing.

5. The cursor control accessory of claim 4 wherein the outwardly facing surfaces are coplanar.

6. The cursor control accessory of claim 4 wherein the outwardly facing surfaces are extended across the one side of the base in an inwardly arcuate configuration adapted to progressively engage the keyboard housing alongside the selected cursor control keys in response to rocking movement of the base.

7. The cursor control accessory of claim 1 wherein the diagonal corners of the base to its one side are relieved to preclude contact of the base with keys in the array located diagonally with respect to the central key and adjacent to the cursor control keys.

8. The cursor control accessory of claim 1 further comprising:
    a handle fixed to the center of the base projecting outwardly from its remaining side.

9. The cursor control accessory of claim 8 wherein the handle includes a manually operable reciprocating element adapted to selectively actuate the central key in the array.

10. A cursor control accessory for a computer keyboard having an array of projecting keys including cursor control keys movably mounted on a keyboard housing, the attachment comprising:
    a base adapted to overlay the array of keys;
    the base having a plurality of perpendicular walls protruding outwardly to one side thereof, the walls being adapted to fit between adjacent keys in the array of keys and having outer edges adapted to engage the keyboard housing;
    and a plurality of key engaging surfaces at the one side of the base corresponding in number and spatial location to selected cursor control keys of a keyboard with which it is adapted to be used and adapted to respectively overlie the corresponding cursor control keys of a keyboard for engaging and depressing the cursor control keys in response to rocking movement of the base relative to the keyboard housing.

11. The cursor control accessory of claim 10 wherein each wall terminates in an inwardly arcuate edge configuration adapted to progressively engage the keyboard housing alongside the cursor control keys in response to rocking movement of the base from a normal overlying position that is parallel to the keyboard housing.

12. The cursor control accessory of claim 10 wherein diagonal corners of the base between perpendicular pairs of the walls are inwardly relieved to preclude contact of the base with keys adjacent to the cursor control keys and located in diagonal corners of the array of keys.

13. The cursor control accessory of claim 10 further comprising:
    a handle fixed to the center of the base and projecting outwardly from its remaining side.

14. The cursor control assembly of claim 13 wherein the handle includes a manually operable reciprocating element adapted to selectively actuate the central key in the array.

15. The cursor control accessory of claim 10 wherein each wall is extended across the one side of the base in a perpendicular cruciform pattern that includes a rectangular recess at the center of the base adapted to be fitted about a central key in the array of keys.

16. The cursor control accessory of claim 10 wherein each wall is extended across the one side of the base in a perpendicular cruciform pattern that includes a rectangular recess at the center of the base adapted to be fitted about a central key in the array of keys, the walls being arranged in two intersecting spaced pairs extending perpendicular to one another across the one side of the base.

17. The cursor control accessory of claim 10 wherein each wall is extended across the one side of the base in a perpendicular cruciform pattern that includes a rectangular recess at the center of the base adapted to be fitted about a central key in the array of keys, the walls being arranged in two intersecting spaced pairs extending perpendicular to one another across the one side of the base;

each pair of walls having an identical outer edge configuration that includes a central section spanning the rectangular recess and inwardly arcuate adjacent terminal sections that span the respective key engaging surfaces at the one side of the base.

18. A cursor control accessory for a computer keyboard, comprising:

a base having two oppositely facing sides;

an inwardly extending central recess at one side of the base;

a plurality of key engaging surfaces arranged about the central recess at the one side of the base;

the central recess being formed by intersecting wall surfaces that surround an inner surface facing to the one side of the base; and the key engaging surfaces being coplanar and outwardly offset from the inner surface.

19. The cursor control accessory of claim 18 wherein the key engaging surfaces are coplanar.

20. The cursor control accessory of claim 18 further comprising:

a handle fixed to the center of the base and projecting outwardly from its remaining side.

21. The cursor control accessory of claim 20 wherein the handle includes a manually reciprocable element.

22. A cursor control accessory for a computer keyboard, comprising:

a base having two oppositely facing sides;

a plurality of key engaging surfaces arranged about the one side of the base;

the base having a plurality of perpendicular walls protruding to the one side thereof and bounding selected key engaging surfaces, each wall terminating in an inwardly arcuate edge configuration.

23. The cursor control accessor of claim 22 wherein the key engaging surfaces are coplanar.

24. The cursor control accessory of claim 22 further comprising:

a handle fixed to the center of the base and projecting outwardly from its remaining side.

25. The cursor control accessory of claim 22 wherein the handle includes a manually reciprocable element.

26. The cursor control accessory of claim 22 wherein each wall is extended across the one side of the base in a perpendicular cruciform pattern that includes a rectangular recess at the center of the base.

27. The cursor control accessory of claim 22 wherein each wall is extended across the one side of the base in a perpendicular cruciform pattern that includes a rectangular recess at the center of the base.

* * * * *